United States Patent
Wang et al.

(10) Patent No.: US 12,323,645 B2
(45) Date of Patent: Jun. 3, 2025

(54) SCALABLE VIDEO COMPRESSION ACCELERATOR FOR AUTONOMOUS DRIVING

(71) Applicants: Baidu USA LLC, Sunnyvale, CA (US); APOLLO INTELLIGENT DRIVING TECHNOLOGY (BEIJING) CO., LTD., Beijing (CN)

(72) Inventors: Qiang Wang, Sunnyvale, CA (US); Manjiang Zhang, Sunnyvale, CA (US); Shuai Wang, Sunnyvale, CA (US)

(73) Assignees: APOLLO INTELLIGENT DRIVING TECHNOLOGY (BEIJING) CO., LTD., Beijing (CN); BAIDU USA LLC, Sunnyvale, CA (US)

( * ) Notice: Subject to any disclaimer, the term of this patent is extended or adjusted under 35 U.S.C. 154(b) by 0 days.

(21) Appl. No.: 17/906,607

(22) PCT Filed: Aug. 9, 2022

(86) PCT No.: PCT/CN2022/111154
§ 371 (c)(1),
(2) Date: Sep. 16, 2022

(87) PCT Pub. No.: WO2024/031333
PCT Pub. Date: Feb. 15, 2024

(65) Prior Publication Data
US 2025/0097491 A1 Mar. 20, 2025

(51) Int. Cl.
*H04N 21/236* (2011.01)
*G06V 20/56* (2022.01)

(52) U.S. Cl.
CPC .......... *H04N 21/236* (2013.01); *G06V 20/56* (2022.01)

(58) Field of Classification Search
CPC ............. H04N 21/236; H04N 21/4223; H04N 21/42607; H04N 21/42615; H04N 21/21805; H04N 5/265; H04N 19/184; G06V 20/56
USPC ........................................... 375/240–240.29
See application file for complete search history.

(56) References Cited

U.S. PATENT DOCUMENTS

| | | | |
|---|---|---|---|
| 9,229,526 B1* | 1/2016 | Neglur | G06F 15/76 |
| 9,478,061 B2* | 10/2016 | Shimizu | G06V 20/56 |
| 2007/0279494 A1* | 12/2007 | Aman | H04N 5/278 |
| | | | 348/169 |
| 2008/0151884 A1* | 6/2008 | Elberbaum | H04L 65/70 |
| | | | 370/389 |

(Continued)

*Primary Examiner* — Nathnael Aynalem
(74) *Attorney, Agent, or Firm* — WOMBLE BOND DICKINSON (US) LLP (57) ABSTRACT

A video system includes a first data gathering node configured to receive a plurality of image streams from a plurality of cameras, respectively. Each of the plurality of cameras captures an environment of an autonomous driving vehicle (ADV). The first data gathering node tags the plurality of image streams with metadata that identifies each of the plurality of image streams, and combines the plurality of image streams with the metadata to form a combined image stream. A second data gathering node is communicatively coupled to the first data gathering node and is to receive the combined image stream from the first data gathering node and output the combined image stream with a second combined image stream.

20 Claims, 8 Drawing Sheets

(56) References Cited

U.S. PATENT DOCUMENTS

| | | | |
|---|---|---|---|
| 2013/0222601 A1* | 8/2013 | Engstrom | H04N 21/4223 |
| | | | 348/159 |
| 2019/0289194 A1* | 9/2019 | Cha | H04N 23/90 |
| 2020/0285056 A1* | 9/2020 | Linde | G06F 3/012 |
| 2022/0180488 A1* | 6/2022 | Nakagawa | B60R 1/27 |
| 2022/0210295 A1* | 6/2022 | Ono | H04N 21/64322 |

* cited by examiner

SCALABLE VIDEO COMPRESSION ACCELERATOR FOR AUTONOMOUS DRIVING

CROSS-REFERENCE TO RELATED APPLICATIONS

This application is a National Stage of International Application No. PCT/CN2022/111154 filed Aug. 9, 2022, which is hereby incorporated by reference in its entirety.

TECHNICAL FIELD

Embodiments of the present disclosure relate generally to operating autonomous driving vehicles. More particularly, embodiments of the disclosure relate to video compression for multiple sensors of autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

An autonomous driving vehicle (ADV) may include multiple image sensors (e.g., cameras) to capture a surrounding environment of the ADV. The surrounding environment may include the physical environment around the ADV such as roads, other vehicles, buildings, people, objects, etc. Each image sensor may produce an image stream. The number of image sensors may vary from one vehicle to another. Various image sensors may be placed at different positions to capture the environment from its perspective, such as from a given location at a given angle relative to the ADV.

SUMMARY

According to one aspect of the present disclosure, a video system is provided, including: a first data gathering node configured to: receive a plurality of image streams from a plurality of cameras, respectively, each of the plurality of cameras capturing at least a portion of an environment of an autonomous driving vehicle (ADV), tag the plurality of image streams with metadata that identifies each of the plurality of image streams, and combine the plurality of image streams with the metadata to form a combined image stream; and a second data gathering node configured to: receive the combined image stream from the first data gathering node, and output the combined image stream with a second combined image stream.

According to one aspect of the present disclosure, an autonomous driving vehicle (ADV) is provided, including: a plurality of cameras; and a video compression system including a first data gathering node configured to: receive a plurality of image streams from a plurality of cameras, respectively, each of the plurality of cameras capturing at least a portion of an environment of an autonomous driving vehicle (ADV), tag the plurality of image streams with metadata that identifies each of the plurality of image streams, and combine the plurality of image streams with the metadata to form a combined image stream; and a second data gathering node configured to: receive the combined image stream from the first data gathering node, and output the combined image stream with a second combined image stream.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect. It should be understood that some of the embodiments shown may be combined with other embodiments even if not shown as such in each figure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

In conventional solutions, a video compression engine integrated in a system on chip (SoC) is difficult to scale to meet the demands for autonomous driving vehicles (ADVs). ADVs typically have multiple camera sensors. A CPU-based solution or other general-purpose processors are inefficient for performing video data processing. As such, there is a need for a video compression accelerator that is scalable, energy efficient, and ready to be integrated with existing ADV computing systems.

According to some embodiments, a video gathering and compression system may include a scalable architecture that can be sized to suit a variety of needs of an autonomous vehicle. The system may include a data gathering stage and a data processing stage.

The data gathering stage may include a plurality of data gathering nodes. Each data gathering node may gather image streams from a plurality of cameras and combine the image streams into a single combined image stream. Each of the data gathering nodes may include data links (e.g., high speed data links) that carries the single combined image stream. Further, each data gathering node may connect to one or more other data gathering nodes to relay one or more additional combined image streams from one or more upstream data gathering nodes to a downstream data gathering node. In such a manner, data gathering nodes may be interconnected (e.g., on a printed circuit board) to scale to the number of cameras that are present on an autonomous driving vehicle.

The data processing stage may include a plurality of data processing nodes that takes the various links (e.g., the combined streams) from the data gathering stage. Each data processing node may separate out one of the single combined streams, and extract from the single combined stream, one of the image streams. The image stream is dispatched to one of a plurality of dedicated processing engines of the data processing node. These processing engines may have an energy efficient architecture that performs video compression with improved efficiency (e.g., compared to a CPU). Remaining channels (e.g., remaining combined image streams) may be sent downstream to another data processing node to repeat the extraction, dispatching, and compression of the data. Thus, similar to the data gathering nodes, the data processing nodes may be ganged together to scale to the number of cameras that are present on the ADV.

In some examples, each node may be housed on a printed circuit board. In some examples, each node may be integrated as a system on chip (SoC). In some examples, each data gathering node may have the same inputs and outputs so that it may connect to an upstream and downstream data gathering node in a modular manner. Similarly, each data processing node may have the same inputs and outputs so that it may connect to an upstream and downstream data processing node.

Figure 1:
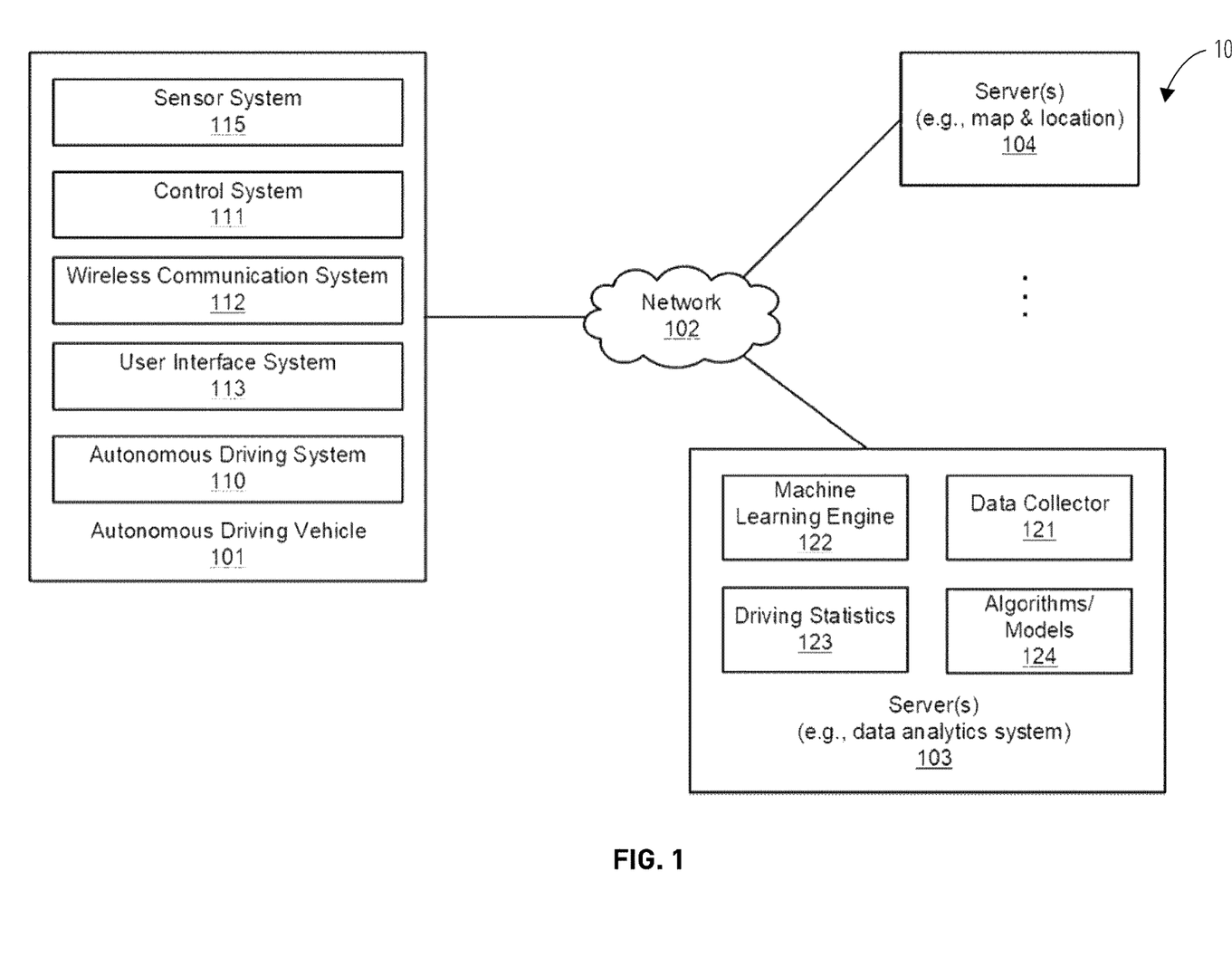
FIG. 1 is a block diagram illustrating a networked system according to one embodiment.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
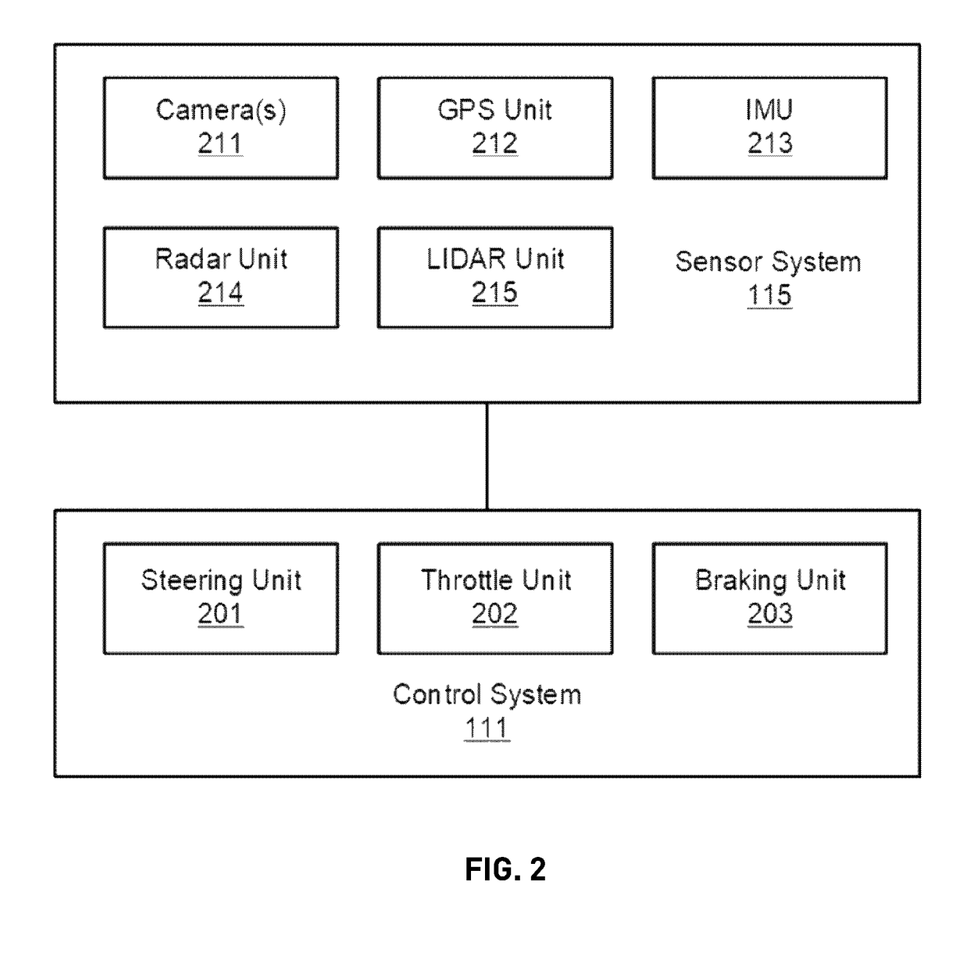
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently. Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 can then be uploaded on ADVs to be utilized during autonomous driving in real-time.

Figure 3A:
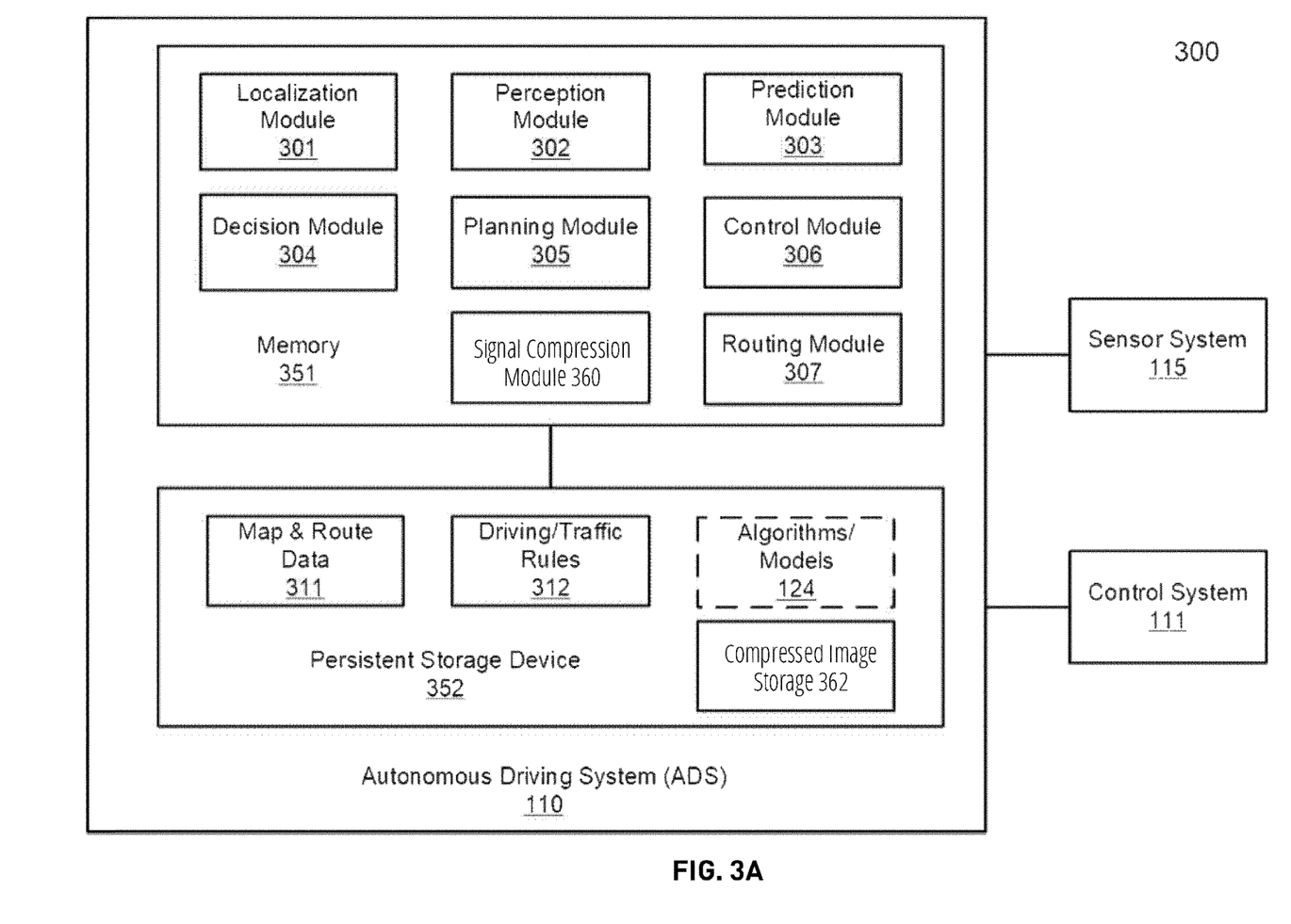
FIG. 3A shows a block diagram illustrating an example of an autonomous driving system used with an autonomous driving vehicle according to one embodiment.
Figure 3B:
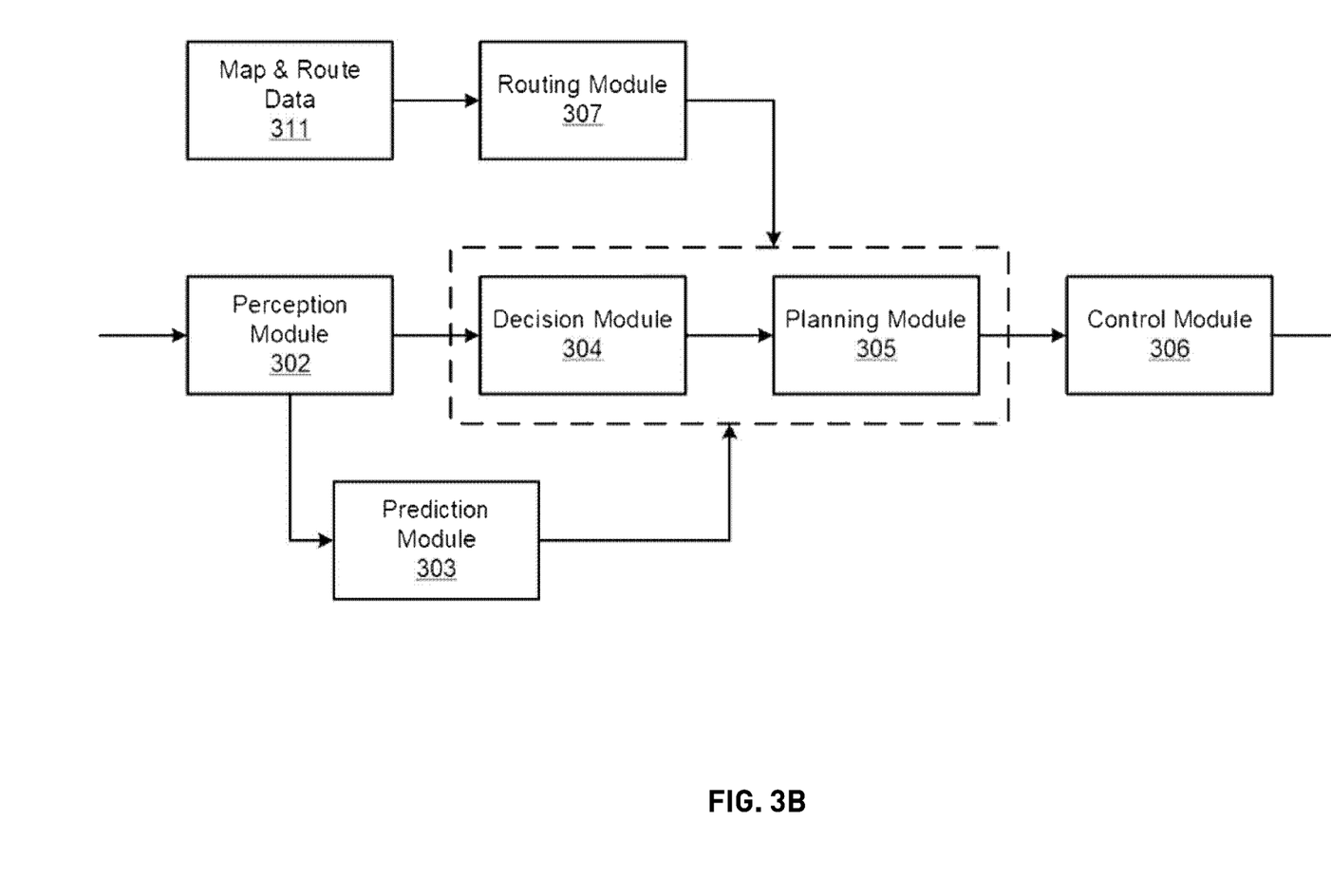
FIG. 3B shows a block diagram illustrating an example of an autonomous driving system used with an autonomous driving vehicle according to one embodiment.

FIG. 3A and FIG. 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of ADV 101 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 101, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 101 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, roadway boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 101 would move in a next moving cycle (e.g., next route/path segment). For example, the planning and control data may instruct vehicle 101 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

In some aspects, autonomous driving system 110 includes a signal compression module 360. Signal compression module 360 may include a data gathering stage and a data processing stage. The data gathering stage receives image streams from cameras 211 of the sensor system 115. The data gathering stage includes two or more data gathering nodes that each receive image streams and combines those image streams. Further, each data gathering node includes a plurality of data links. The data links can carry the locally combined stream and relay combined streams from upstream to downstream nodes, thereby collecting the combined streams and directing them through a bus to the data processing stage.

The data processing stage may include two or more data processing nodes. Each data processing node may include a splitter that takes one of the data links (carrying one combined image stream) and sends remaining data links to a downstream data processing node. In the data processing node, the combined image stream that is kept is then split off into the various image streams that it was formed from. Those image streams are dispatched to processing engines of the data processing node that compress each image stream. The processing engines may have dedicated video data compression hardware (e.g., a non-CPU architecture or non GP-GPU architecture). Each processing engine may output a compressed image stream. The compressed image streams may be stored to compressed image storage 362. Compressed image storage 362 may include non-volatile computer-readable memory (e.g., a disk drive or non-volatile solid state memory). The compressed image streams may be stored and used off-line for various purposes such as, for example, to gather map data. The images may be used to stitch together scenes of various environments.

In some embodiments, cameras 211 may be used for perception, as described, as well as for gathering data for off-line use. The off-line data may be compressed with signal compression module 360 as described. As such, the cameras 211 may be used for dual purposes, such as for driving the ADV and for data gathering. Signal compression module 360 may correspond to a signal compression module described in other sections (e.g., with respect to FIG. 5).

Figure 4:
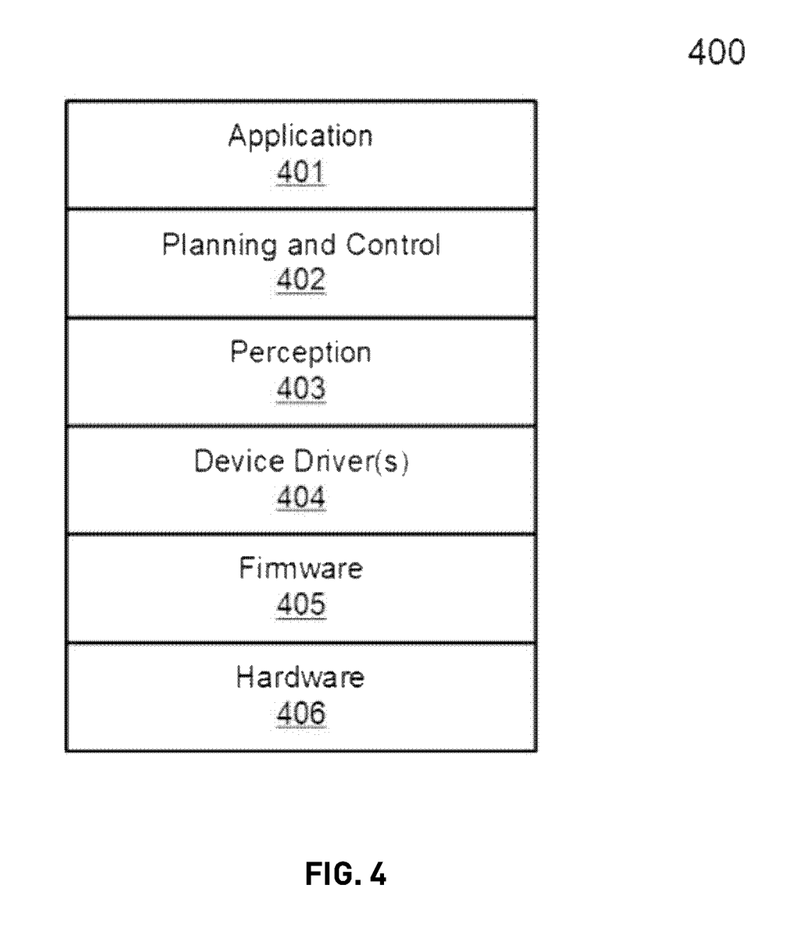
FIG. 4 is a block diagram illustrating system architecture for autonomous driving according to one embodiment.

FIG. 4 is a block diagram illustrating system architecture for autonomous driving according to one embodiment. System architecture 400 may represent system architecture of an autonomous driving system as shown in FIG. 3A and FIG. 3B.

Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302.

In one embodiment, there is an additional layer including the functionalities of prediction module 303 and/or decision module 304. Alternatively, such functionalities may be included in PNC layer 402 and/or perception layer 403.

System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5:
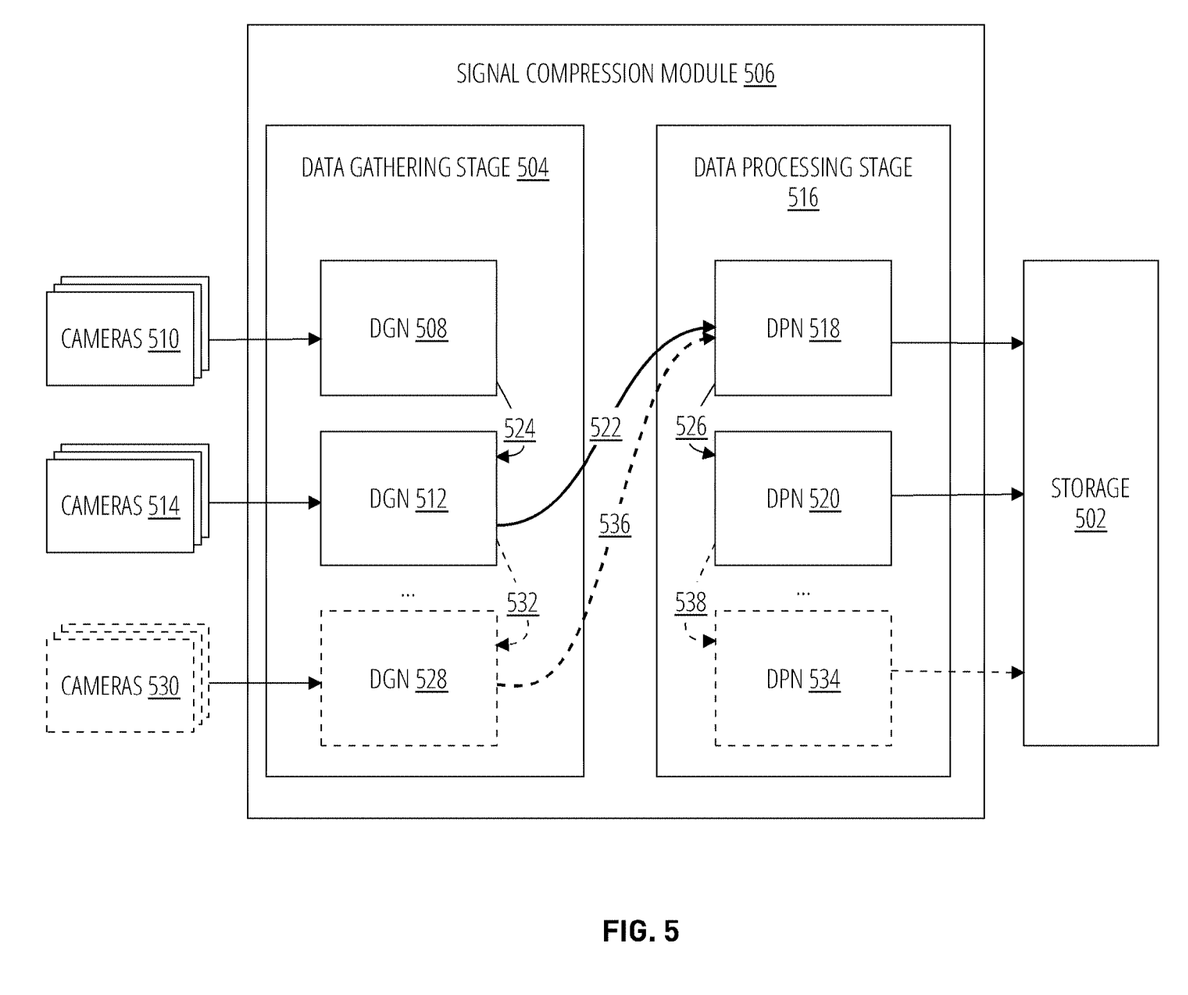
FIG. 5 shows an example of a signal compression module according to one embodiment.

FIG. 5 shows an example of a signal compression module in accordance with some embodiments. The signal compression module 506 may correspond to a signal compression module described in other sections with respect to other figures. Similarly, the data processing stage 516 and data gathering stage 504 may correspond to those described in other sections with respect to other figures. The signal compression module 506 or 360 may be referred to as a video system.

Generally, the signal compression module 506 may include a data gathering stage 504 and a data processing stage 516. The data gathering stage 504 gathers image streams from cameras of the ADV such as cameras 510, cameras 514, and cameras 530. Cameras 510 may represent multiple cameras. Similarly, cameras 514 may represent multiple cameras, and so on. The image streams are combined and directed to the data processing stage 516. The data processing stage 516 separates the combined image streams into the individual image streams and compresses those image streams. The compressed image streams may be put in storage 502 and used for off-line purposes.

In some embodiments, a data gathering node 508 is configured to receive a plurality of image streams from a plurality of cameras 510, respectively. Each of the plurality of cameras 510 captures an environment of an autonomous driving vehicle (ADV). The data gathering node 508 is configured to tag the plurality of image streams with metadata that identifies each of the plurality of image streams, and to combine the plurality of image streams with the metadata to form a combined image stream. For example, the combined image stream may include all the frames of each of the individual image streams from cameras 510, but each of those frames may be tagged with camera identifiers to identify which camera each frame originated from. The metadata may be used downstream (e.g., in the data processing stage 516) to extract and dispatch the various image streams.

A second data gathering node 512 is communicatively coupled to the data gathering node 508. The second data gathering node 512 may be configured to receive the combined image stream 524 from the data gathering node 508 and output the combined image stream with a second combined image stream. Each data gathering node may be configured to receive image streams from respective cameras, combine those image streams, then send the combined image streams to a downstream data gathering node.

For example, the second data gathering node 512 is configured to receive a second plurality of image streams from a second plurality of cameras 514, respectively. The second data gathering node 512 is configured to tag the second plurality of image streams with second metadata that identifies each of the second plurality of image streams (to each of cameras 514), combine the second plurality of image streams with the second metadata to form the second combined image stream, and output the second combined image stream and the first combined image stream to a third data gathering node 528 or to a data processing node (e.g., data processing node 518).

For example, if no additional downstream data gathering nodes are present, the second data gathering node 512 may output the combined image stream (from DGN 508) with the second combined image stream through communication 522 to the data processing stage 516. If an additional data gathering node (e.g., DGN 528) is present, the second data gathering node 512 may output the combined image stream with the second combined image stream through connection 532 to a third data gathering node 528.

A data processing node 518 may be configured to receive at least the combined image stream and the second combined image stream (e.g., at communication 522), extract each of the plurality of image streams from the combined image stream based on the metadata, and compress the plurality of image streams with a plurality of processing engines of the data processing node, resulting in a plurality of compressed image streams.

The data processing node 518 may output at least the second combined image stream to a second data processing node through connection 526.

A second data processing node 520 may be configured to receive at least the second combined image stream (e.g., through connection 526), extract each of the second plurality of image streams from the second combined image stream based on the second metadata, and compress the second plurality of image streams with a second plurality of processing engines of the second data processing node, resulting in a second plurality of compressed image streams.

The second data processing node 520 is configured to output an additional combined image stream to a third data processing node (e.g., data processing node 534) in response to receiving an additional combined image stream from the data processing node. This output may be shown as connection 538. The third data processing node 534 may take the additional combined image stream and compress those image streams contained in the additional combined image stream, and so on.

For example, if data gathering stage 504 includes a third data gathering node 528 that generates a third combined image stream from image streams from cameras 530, then the data link from the data gathering stage 504 to data processing stage 516 (shown as communication 536) may contain the combined image stream (from data gathering node 508), the second combined image stream (from data gathering node 512), and the third combined image stream (from data gathering node 528). Each of these combined image streams may carried within the DGNs and DPNs on a dedicated hardware link.

As such, connections 522 and 536 may include wiring, traces, or wireless links that support transmission of these data links. The data processing node 518 may take the combined image stream and compress those image streams contained therein, and pass along the second combined image stream and the third combined image stream to data processing node 520 (shown as communication 526). Data processing node 520 takes the second combined image stream, and passes the third combined image stream to data processing node 534 (shown as communication 538). Although shown with three, more or less data gathering nodes, data processing nodes, or both, may be implemented to scale to a given ADV.

The plurality of compressed image streams (from data processing node 518) and the plurality of second compressed image streams (from data processing node 520) may be stored in storage 502. Additional compressed image streams (e.g., from data processing node 534) may also be stored in storage 502. Storage 502 may include non-volatile computer-readable memory.

Each data gathering node and data processing node may include processing logic which is configured to perform the various operations described in the present disclosure. Processing logic may comprise hardware (e.g., circuitry, dedicated logic, programmable logic, a processor, a processing device, a central processing unit (CPU), memory, a system-on-chip (SoC), etc.), software (e.g., instructions running/executing on a processing device), firmware (e.g., microcode), or a combination thereof.

Figure 6:
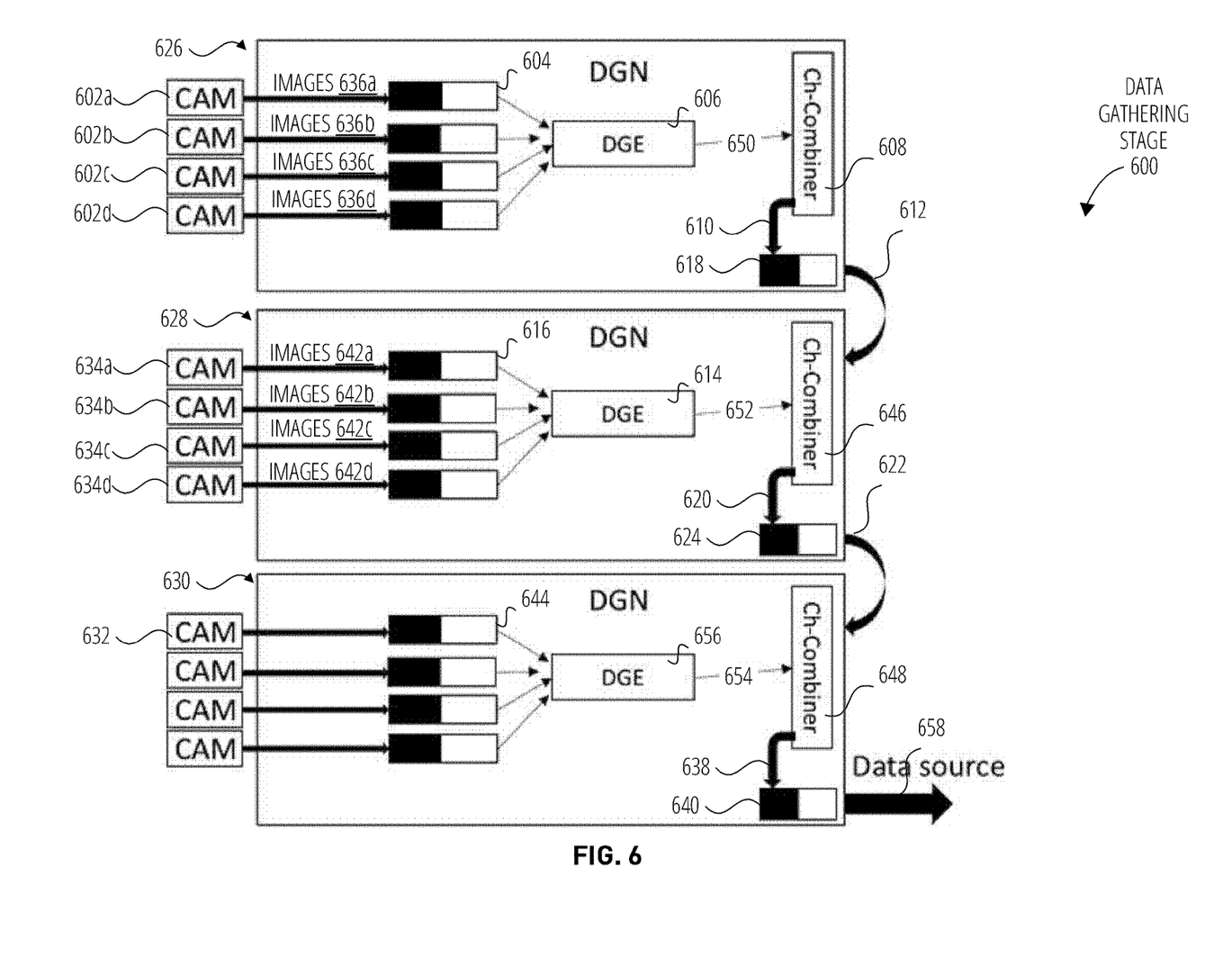
FIG. 6 shows an example of a data gathering stage of a video compression system according to one embodiment.

FIG. 6 shows an example of a data gathering stage of a video compression system, in accordance with some embodiments. The scalable video data gathering system includes multiple data gathering nodes (DGNs) such as data gathering node 626, 628, and 630. Each DGN connects to multiple camera sensors. On each DGN, the camera data may be buffered and then gathered together at a data gathering engine (DGE) to build a single data channel (e.g., a combined image stream). A channel combiner may combine local data channel with data channels from upstream, to build a larger data stream for downstream DGNs. The DGNs may be connected as a cascade, so that the data gathering stage and video compression system may be extended and scaled. The nodes may be cascaded so long as the data links (e.g., 612, 622, 658) between nodes are fast enough. With such an arrangement, each DGN may have at most one data source link (e.g., a connection to an upstream node) and at most one data sink link (e.g., a connection to a downstream node). Such an architecture provides simple interconnections, data flow, and a scalability.

The data gathering stage 600 may include a data gathering node 626 which is configured to receive a plurality of image streams from a plurality of cameras, respectively. For example, data gathering stage 504 may receive image stream 636a from camera 602a, image stream 636b from camera 602b, image stream 636c from camera 602c, and image stream 636d from camera 602d. Each of the plurality of cameras captures an environment of an autonomous driving vehicle (ADV). The cameras may be positioned to capture various directions relative to the ADV. Each image stream may have a video format such as a raw video format or an uncompressed video format.

Data gathering node 626 may be configured to tag the plurality of image streams with metadata that identifies each of the plurality of image streams, and combine the plurality of image streams with the metadata to form a combined image stream. For example, each frame or image of image stream 636a may be tagged with a camera identifier that maps to camera 602a. Similarly, each frame or image of image stream 636b may be tagged with camera identifier that maps to camera 602b, and so on. At the data processing stage, the metadata tags may be used to separately parse out each image stream from the combined image stream.

The data gathering stage 600 may include a second data gathering node 628 that is communicatively coupled to the data gathering node 626. The second data gathering node 628 is downstream of data gathering node 626 and is configured to receive the combined image stream (shown as 612) from the data gathering node 626. The second data gathering node 628 is configured to output the combined image stream (from data gathering node 626) with a second combined image stream.

For example, the second data gathering node 628 is configured to receive a second plurality of image streams (e.g., 642a, 642b, 642c, and 642d) from a second plurality of cameras (e.g., 634a, 634b, 634c, and 634d), respectively. At data gathering engine 606, the second data gathering node 628 tags each of the second plurality of image streams with second metadata that identifies each of the second plurality of image streams.

At DGE 614, the second data gathering node 628 combines the second plurality of image streams (along with the second metadata) to form the second combined image stream 652. The second data gathering node outputs the second combined image stream and the first combined image stream (shown as data stream 620) to a third data gathering node (e.g., through connection 622). If there are no additional downstream data gathering nodes, the second data gathering node may connect and send the combined image streams to a data processing node of a data processing stage as discussed in other sections. Each data gathering engine (e.g., 606, 614, and 656) may tag each respective image stream with metadata that identifies the camera that produced the image stream. This metadata may be embedded in the local combined image stream (e.g., 650, 652, and 654) on a frame-by-frame basis. Thus, although a combined image stream may be combined into a single channel, each frame in that image stream may be mapped back to its original camera and image stream.

In some embodiments, each data gathering node may receive the plurality of image streams from the plurality of cameras through a respective image buffer. For example, data gathering node 626 may include a plurality of buffers such as buffer 604 (e.g., a first in first out memory buffer) that each buffers a respective image stream. Data gathering node 628 may include similar buffers such as buffer 616 to buffer image stream 642a. Data gathering node 630 may include similar buffers such as buffer 644 to buffer image streams from its dedicated cameras, such as camera 632.

Each data gathering node may include a plurality of channel links. For example, each data gathering node may include a channel combiner (e . . . , 608, 646, and 648) which has a plurality of channel links. Each channel link may include independent hardware (e.g., traces, connectors, or other hardware) that carries data such as a combined image stream. The channel combiner may receive the combined image stream from its local data gathering node, as well as one or more combined image streams from an upstream node. The channel combiner includes hardware that routes the local combined image stream with any upstream combined image streams (if present) to a downstream node (if present), or to a data processing stage.

For example, in data gathering node 626, the channel combiner 608 may include a plurality of channel links. A first of the plurality of channel links may receive the local combined image stream 650 from the data gathering engine 606. Data gathering node 626 does not have an upstream node attached to it, so each remaining one of the plurality of channel links is not used. The channel combiner 608 routes the combined image stream 650 to a buffer 618. This may be shown as connection 610, which may contain only the combined image stream 650. Connection 610 may include other data links that are empty. The buffered combined image stream is routed downstream (through connection 612) to data gathering node 628.

The second data gathering node 628 includes a channel combiner 646 which includes a second plurality of channel links. A first of the second plurality of channel links receives and carries the combined image stream 650 and a second of the second plurality of channel links carries the second combined image stream (e.g., the local combined image stream 652). In this example, with just the single upstream data gathering node 626, each remaining one of the second plurality of channel links (e.g., a third, fourth, or fifth channel link) in channel combiner 646 may be unused (e.g., not carrying data). The channel combiner 646 may route the combined image streams to a buffer 624. The output of the buffer may be sent to a downstream data gathering node, such as data gathering node 630, or to a data processing node (not shown).

Similarly, a third data gathering node 630 may receive the combined image stream and the second combined image stream over connection 622 and carry these internally on data links of channel combiner 648. Channel combiner 648 combines these image streams with a third combined image stream 654 and routes these to a buffer 640 over connection 638. The combined image streams from each of the data gathering nodes may be routed to a data processing stage through connection 658.

Each of connections 612, 622, or 658 may be a bus that includes multiple data links. Each of those data links may include one or more combined image stream from a data gathering node, that number depending on how many data gathering nodes are connected in the data gathering stage. The bus may include hardware such as connectors, wires, PCB traces, or wireless communications or a combination thereof. The bus may include high speed data links.

The operations and functionality of each of the various components shown may be carried out by processing logic, which may include dedicated hardware and/or software. Although shown with three nodes, a data gathering stage 600 may include two or more nodes, depending on the needs of an ADV.

Figure 7:
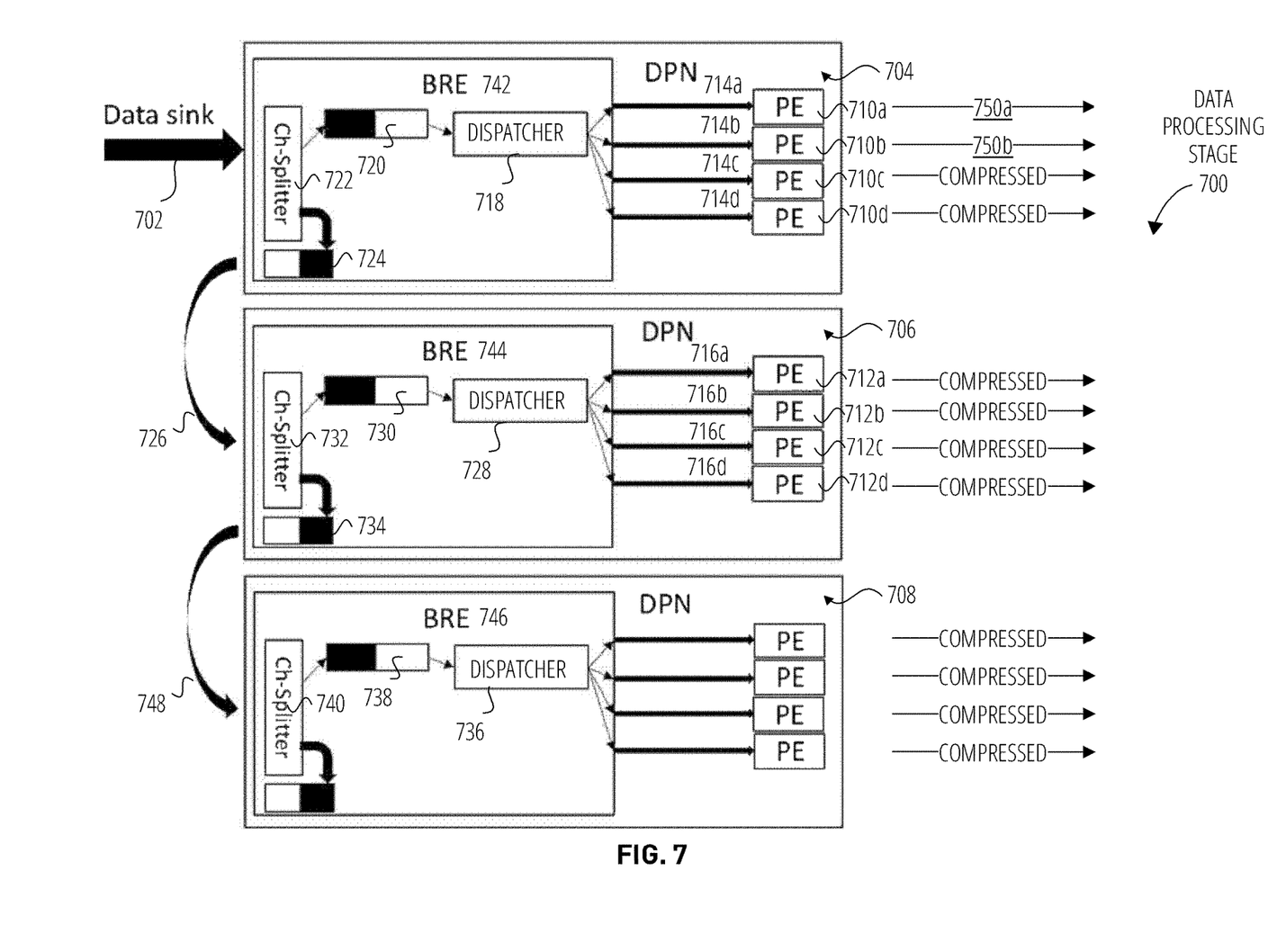
FIG. 7 shows an example of a data processing stage of a video compression system according to one embodiment.

FIG. 7 shows an example of a data processing stage 700 of a video compression system, in accordance with some embodiments.

The scalable data processing stage 700 may include multiple data processing nodes (DPNs) such as DPNs 704, 706, and 708. Each DPN may obtain input data through an input data interface (e.g., channel splitters 722, 732, 740, and buffers 720, 730, 738). A data bridging engine (BRE) such as BRE 742, 744, and 746) offloads one or more of the combined image streams from the input data. This offloading may be performed based on the DPN's processing capacity. In some examples, each BRE may offload at least one entire combined image stream. The remaining data channels (e.g., remaining combined image streams) are forwarded to downstream DPNs (e.g., through connections 726 or 748).

The offloaded data on a DPN goes through a dispatcher such as dispatcher 718, 728, and 736. The dispatcher may use the metadata tags on the combined image stream and separate out each individual image stream (e.g., from a given camera). Each image stream may be fed to a processing engine (PE) such as 710a-710d. The PEs may perform video data compression on each stream. The DPNs in the system may be connected as a cascade, so that processing power of the system is scalable. Each DPN may have at most one data source (e.g., an upstream connection) and at most one data sink interface (e.g., a downstream connection). With such an architecture, the data processing stage and video compression system has scalability and simple interconnections and dataflow.

The data processing stage may include a data processing node 704 that is configured to receive at least the combined image stream and the second combined image stream from connection 702. This data may be referred to as a data sink and it may contain two or more combined image streams that is received from two or more data gathering nodes, such as DGNs 626 and 628 as described in other sections.

The data processing node 704 may extract each of the plurality of image streams from the combined image stream based on the metadata. For example, at BRE 742, a channel splitter 722 may include a plurality of data links, each data link may receive and carry a combined image stream from connection 702. The channel splitter 722 may route one or more of the combined image streams to buffer 720. The dispatcher 718 may extract from a combined image stream, each individual image stream (e.g., from a given camera) using the tagged metadata. Depending on the processing power of each processing engine, the dispatcher may route one or more image streams to each processing engine. For example, the dispatcher may route image stream 714a to PE 710a, image stream 714b to PE 710b, and so on. In some examples, the metadata is applied to the image stream as a protocol. For example, the data frames of various camera streams may be combined (at a data gathering node) with a known protocol that specifies (e.g., through the format of the protocol) which frame belongs to which camera. The data processing node 704 may, at dispatcher block 718, unpack the combined image stream in accordance with the format of the protocol, to extract out each individual image stream.

The data processing node 704 may compress the plurality of image streams 714*a*, 714*b*, 714*c*, and 714*d* with plurality of processing engines 710*a*, 710*b*, 710*c*, and 710*d*, resulting in a plurality of compressed image streams. For example, PE 710*a* may compress image stream 714*a*, to a compressed image stream 750*a*. PE 710*b* may compress image stream 714*b* to a compressed image stream 750*b*, and so on. The compressed streams may be stored in computer-readable memory, or used for perception by the ADV, or both.

The data processing node 704 may route remaining combined image streams (e.g., a second combined image stream and a third combined image stream) from the channel splitter 722 to a data link buffer 724. The output of the buffer may be routed to one or more downstream data processing nodes (e.g., through connection 726).

A second data processing node 706 may be configured to receive at least the second combined image stream (and more if present) through connection 726. As described, the total number of channels (e.g., combined image streams) received through connection 726 may depend on how many are received at data sink 702 and how many are offloaded at channel splitter 722. For example, if four channels (e.g., four combined image streams) are received through data sink 702, and DPN 704 offloads one channel, then the second DPN 706 may receive three channels (three combined image streams). It should be understood that the number of processing engines in a DPN is not necessarily correlated to the number of image streams received by a data gathering node. As such, in some cases, a PE may process multiple image streams (e.g., a dispatcher may dispatch multiple image streams to a single PE). Further, a single data processing node may offload multiple channels (e.g., multiple combined image streams).

The second data processing node 706 may extract each of the second plurality of image streams from the second combined image stream based on the second metadata. For example, channel splitter 732 may route the second combined image stream obtained from connection 726 to dispatcher 728 through a buffer 730. Remaining channels (e.g., a third combined image stream), if present, may be routed downstream through buffer 734 and connection 748.

The second data processing node 706 may compress the second plurality of image streams with a second plurality of processing engines (e.g., 712*a*, 712*b*, 712*c*, and 712*d*) of the second data processing node, resulting in a second plurality of compressed image streams. For example, dispatcher 728 may extract out each image stream (e.g., image stream 716*a*, 716*b*, 716*c*, and 716*d*) from the second combined image stream, and dispatch each image stream to a processing engine. The second data processing node 706 may output an additional combined image stream to a third data processing node in response to receiving an additional combined image stream from the data processing node. For example, if connection 726 includes a third combined image stream, this may be buffered (at buffer 734) and routed downstream to data processing node 708 through connection 748.

As discussed, each data processing node may be configured to buffer the combined image stream (e.g., at buffers 720, 730, or 738, respectively) prior to extracting each of the plurality of image streams from the combined image stream.

Each of connections 702, 726, or 748 may be a bus that includes multiple data links. Each of those data links may include a combined image stream that originates from a data gathering node. Each bus may include hardware such as connectors, wires, PCB traces, or wireless communications or a combination thereof. The bus may include high speed data links.

The operations and functionality of each of the various components shown may be carried out by processing logic, which may include dedicated hardware (e.g., data links, buffers, memory, programmable logic, or processing devices) and/or software. Although shown with three nodes, a data processing stage 700 may include two or more nodes, depending on the needs of an ADV.

In some examples, the PEs may include dedicated video data compression hardware, such as non-central processing unit (CPU) or non-general purpose graphics processing unit (GP-GPU) hardware. The PEs may operate with improved energy efficiency compared to CPU or GP-GPUs based video compression. The PEs may be interconnected in a manner to scale (e.g., increase or decrease) and meet the demands of an ADV.

In some examples, the camera data gathering and dispatching operations may be implemented using a custom defined protocol or data package format that maintains integrity of individual sensor data. In some examples, the data channel combiner or splitter can be implemented with a standard serial link protocol like Xilinx/AMD Aurora, Intel/Altera SerialLite II, or equivalent technology.

In some examples, some of the operations and blocks in the system are configurable using a programmable logic device such as a field programmable gate array (FPGA) or a system on chip (SoC), which may be integral to processing logic. In some examples, the data gathering or processing nodes may be connected with a star, a full mesh, or a 2D grid architecture, to build a scalable video compressing accelerator. Connections between nodes may be made as PCB trace, with known interfaces (e.g., PCIE interface), or with other interface technology or a combination thereof.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A video system, comprising:
   a first data gathering node configured to:
   receive a first plurality of image streams from a first plurality of cameras, respectively, each of the first plurality of cameras capturing at least a portion of an environment of an autonomous driving vehicle (ADV),
   tag the first plurality of image streams with metadata that identifies each of the first plurality of image streams, and
   combine the first plurality of image streams with the metadata to form a first combined image stream; and
   a second data gathering node configured to:
   receive the first combined image stream from the first data gathering node, and
   output the first combined image stream with a second combined image stream obtained from a second plurality of cameras;
   wherein the second plurality of cameras are different from the first plurality of cameras.

2. The video system of claim 1, wherein the second data gathering node is further configured to:
   receive a second plurality of image streams from the second plurality of cameras, respectively;
   tag the second plurality of image streams with second metadata that identifies each of the second plurality of image streams;
   combine the second plurality of image streams with the second metadata to form the second combined image stream; and
   output the second combined image stream and the first combined image stream to a third data gathering node or to a data processing node.

3. The video system of claim 1, wherein the first data gathering node receives the first plurality of image streams from the first plurality of cameras through a respective image buffer.

4. The video system of claim 1, wherein the first data gathering node includes a plurality of channel links, wherein a first of the plurality of channel links that carries the first combined image stream and wherein each remaining one of the plurality of channel links is not used.

5. The video system of claim 1, wherein the second data gathering node includes a second plurality of channel links, wherein a first of the second plurality of channel links receives and carries the first combined image stream and a second of the second plurality of channel links carries the second combined image stream, and each remaining one of the second plurality of channel links are not used.

6. The video system of claim 1, wherein the first data gathering node is further configured to buffer the first combined image stream.

7. The video system of claim 1, further comprising a first data processing node, configured to:
   receive at least the first combined image stream and the second combined image stream;
   extract each of the first plurality of image streams from the first combined image stream based on the metadata;
   compress the first plurality of image streams with a plurality of processing engines of the first data processing node, resulting in a first plurality of compressed image streams; and
   output at least the second combined image stream to a second data processing node.

8. The video system of claim 7, wherein the second data processing node is configured to:
   receive at least the second combined image stream;
   extract each of a second plurality of image streams from the second combined image stream based on the second metadata;
   compress the second plurality of image streams with a second plurality of processing engines of the second data processing node, resulting in a second plurality of compressed image streams; and
   output an additional combined image stream to a third data processing node in response to receiving the additional combined image stream from the first data processing node.

9. The video system of claim 8, wherein the first data processing node is further configured to buffer the first combined image stream prior to extracting each of the first plurality of image streams from the first combined image stream.

10. The video system of claim 8, wherein the first plurality of compressed image streams and the second plurality of compressed image streams are stored in non-volatile computer-readable memory.

11. An autonomous driving vehicle (ADV), comprising:
    a first plurality of cameras; and a video compression system comprising
  a first data gathering node configured to:
    receive a first plurality of image streams from the first plurality of cameras, respectively, each of the first plurality of cameras capturing at least a portion of an environment of the autonomous driving vehicle (ADV),
    tag the first plurality of image streams with metadata that identifies each of the first plurality of image streams, and
    combine the first plurality of image streams with the metadata to form a first combined image stream; and
  a second data gathering node configured to:
    receive the first combined image stream from the first data gathering node, and
    output the first combined image stream with a second combined image stream obtained from a second plurality of cameras;
    wherein the second plurality of cameras are different from the first plurality of cameras.

12. The ADV of claim 11, wherein the second data gathering node is further configured to:
  receive a second plurality of image streams from the second plurality of cameras, respectively;
  tag the second plurality of image streams with second metadata that identifies each of the second plurality of image streams;
  combine the second plurality of image streams with the second metadata to form the second combined image stream; and
  output the second combined image stream and the first combined image stream to a third data gathering node or to a data processing node.

13. The ADV of claim 11, wherein the first data gathering node receives the first plurality of image streams from the first plurality of cameras through a respective image buffer.

14. The ADV of claim 11, wherein the first data gathering node includes a plurality of channel links, wherein a first of the plurality of channel links that carries the first combined image stream and wherein each remaining one of the plurality of channel links is not used.

15. The ADV of claim 11, wherein the second data gathering node includes a second plurality of channel links, wherein a first of the second plurality of channel links receives and carries the first combined image stream and a second of the second plurality of channel links carries the second combined image stream, and each remaining one of the second plurality of channel links are not used.

16. The ADV of claim 11, wherein the first data gathering node is further configured to buffer the first combined image stream.

17. The ADV of claim 11, wherein the video compression system further comprise a first data processing node, configured to:
  receive at least the first combined image stream and the second combined image stream;
  extract each of the first plurality of image streams from the first combined image stream based on the metadata;
  compress the first plurality of image streams with a plurality of processing engines of the first data processing node, resulting in a first plurality of compressed image streams; and
  output at least the second combined image stream to a second data processing node.

18. The ADV of claim 17, wherein the second data processing node is configured to:
  receive at least the second combined image stream;
  extract each of a second plurality of image streams from the second combined image stream based on the second metadata;
  compress the second plurality of image streams with a second plurality of processing engines of the second data processing node, resulting in a second plurality of compressed image streams; and
  output an additional combined image stream to a third data processing node in response to receiving the additional combined image stream from the first data processing node.

19. The ADV of claim 18, wherein the first data processing node is further configured to buffer the first combined image stream prior to extracting each of the first plurality of image streams from the first combined image stream.

20. The ADV of claim 18, wherein the first plurality of compressed image streams and the second plurality of compressed image streams are stored in non-volatile computer-readable memory.

* * * * *